US011984019B2

(12) United States Patent
Yamada

(10) Patent No.: US 11,984,019 B2
(45) **Date of Patent: *May 14, 2024**

(54) APPARATUS, SYSTEM, AND METHOD OF MONITORING, AND RECORDING MEDIUM

(71) Applicant: Ricoh Company, Ltd., Tokyo (JP)

(72) Inventor: Satoru Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,509

(22) Filed: Feb. 7, 2023

(65) Prior Publication Data

US 2023/0186757 A1 Jun. 15, 2023

Related U.S. Application Data

(63) Continuation of application No. 17/106,404, filed on Nov. 30, 2020, now Pat. No. 11,587,430, which is a (Continued)

(30) Foreign Application Priority Data

Mar. 2, 2016 (JP) ................................ 2016-039549
Feb. 28, 2017 (JP) ................................ 2017-036417

(51) Int. Cl.
*G08C 17/00* (2006.01)
*H05B 47/19* (2020.01)
*H05B 45/00* (2022.01)

(52) U.S. Cl.
CPC ............ *G08C 17/00* (2013.01); *H05B 47/19* (2020.01); *G08C 2201/50* (2013.01); *H05B 45/00* (2020.01)

(58) Field of Classification Search
CPC .... H05B 47/19; H05B 45/00; H05B 37/0272; H05B 33/0842; G08C 2201/50; G08C 17/00; H04Q 2209/823; H04Q 9/00
See application file for complete search history.

(56) References Cited

U.S. PATENT DOCUMENTS 6,400,968 B1 6/2002 White et al.
7,079,808 B2 7/2006 Striemer
(Continued)

FOREIGN PATENT DOCUMENTS

JP 2003-243189 A 8/2003
JP 2005-78138 A 3/2005
(Continued)

OTHER PUBLICATIONS

Japanese Office Action dated Nov. 24, 2021, in corresponding Japanese Application No. 2021-004555.
(Continued)

*Primary Examiner* — Sisay Yacob
(74) *Attorney, Agent, or Firm* — XSENSUS LLP

(57) ABSTRACT

An apparatus, system, and method of remotely monitoring receives, from an operation terminal, identification information and location information of a location of one or more lamps, stores, in a memory, the received identification information and the received location information in association with each other for the one or more lamps, updates log information regarding a log of a lighting condition of the one or more lamps, in response to an indication that an electric circuit of the one or more lamps is energized for the one or more lamps, and sends monitoring information corresponding to the log information of the electric circuit of the one or more lamps for display.

42 Claims, 14 Drawing Sheets

Related U.S. Application Data continuation of application No. 16/661,405, filed on Oct. 23, 2019, now Pat. No. 10,904,991, which is a continuation of application No. 16/200,761, filed on Nov. 27, 2018, now Pat. No. 10,512,141, which is a continuation of application No. 15/448,272, filed on Mar. 2, 2017, now Pat. No. 10,154,572.

(56) References Cited

U.S. PATENT DOCUMENTS

| | | | | |
|---|---|---|---|---|
| 9,526,153 | B2 | 12/2016 | Noori et al. | |
| 2005/0054292 | A1* | 3/2005 | Janusz | H04Q 9/00 455/445 |
| 2008/0203928 | A1* | 8/2008 | Frumau | H05B 47/19 250/214 R |
| 2010/0066484 | A1* | 3/2010 | Hanwright | H04L 12/40013 455/66.1 |
| 2011/0244846 | A1* | 10/2011 | Min | H04M 1/72406 455/420 |
| 2012/0274234 | A1* | 11/2012 | Campbell | H05B 47/175 315/294 |
| 2015/0092108 | A1 | 4/2015 | Okuhara | |
| 2015/0127556 | A1 | 5/2015 | Harada et al. | |

FOREIGN PATENT DOCUMENTS

| | | | |
|---|---|---|---|
| JP | 2005-94526 | A | 4/2005 |
| JP | 2005-184167 | A | 7/2005 |
| JP | 2007-511976 | A | 5/2007 |
| JP | 2008-86024 | A | 4/2008 |
| JP | 2009-135783 | A | 6/2009 |
| JP | 2011-227715 | A | 11/2011 |
| JP | 2012-027787 | A | 2/2012 |
| JP | 2014-143513 | A | 8/2014 |
| JP | 2014-165601 | A | 9/2014 |
| JP | 2015-69331 | A | 4/2015 |
| JP | 2015-160131 | A | 9/2015 |
| JP | 2016-218969 | A | 12/2016 |
| WO | 2014/171104 | A1 | 10/2014 |

OTHER PUBLICATIONS

Echonet Lite Specification, Part I Echonet Lite Overview, Echonet Consortium, Version 1.11, Jul. 9, 2014, 23 pages.

Office Action dated Aug. 1, 2023 in Japanese Patent Application No. 2022-075659, 9 pages.

Office Action issued Dec. 12, 2023 in Japanese Patent Application No. 2022-075659, 8 pages.

* cited by examiner

FIG. 4A

USER INFORMATION MANAGEMENT TABLE 500

| USER ID | USER NAME | PASSWORD |
|---|---|---|
| aaa@xxx.yy.com | MR. A | 12345 |
| bbb@xxx.yy.com | MR. B | 23451 |
| ccc@xx.co.jp | MR. C | 34512 |
| ddd@xxx.ne.jp | MR. D | 45123 |
| ... | ... | ... |

FIG. 4B

ADAPTER INFORMATION MANAGEMENT TABLE 600

USER ID: aaa@xxx.yy.com

| NAME | INSTALLED LOCATION | SERIAL NUMBER | TRANSMISSION INTERVAL (MINUTE) |
|---|---|---|---|
| KITCHEN 1 | ENTRANCE OF KITCHEN | 1234567890 | 5 |
| KITCHEN 2 | ABOVE SINK | 2345678901 | 5 |
| LAVATORY | LAVATORY | 3456789012 | 1 |
| WASHSTAND | RIGHT SIDE OF WASHSTAND | 4567890123 | 1 |
| LIVING | LIVING | 5678901234 | 10 |
| BEDROOM | BEDROOM | 6789012345 | 1 |
| FRONT DOOR | FRONT DOOR | 7890123456 | 1 |
| ... | ... | ... | ... |

FIG. 4C

WARNING CONFIGURATION INFORMATION MANAGEMENT TABLE 700

| USER ID | WARNING CONDITION (TIME) | WARNING DESTINATION 1 | WARNING DESTINATION 2 |
|---|---|---|---|
| aaa@xxx.yy.com | 6 | aaa@xxx.yy.com | – |
| bbb@xxx.yy.com | 12 | eee@yyy.com | x.city@xx.org |
| ccc@xx.co.jp | 8 | ccc@xx.co.jp | doctor@hospital.com |
| ddd@xxx.ne.jp | 24 | ddd@xxx.ne.jp | – |
| ... | ... | ... | ... |

APPARATUS, SYSTEM, AND METHOD OF MONITORING, AND RECORDING MEDIUM

CROSS-REFERENCE TO RELATED APPLICATIONS

This application is a continuation of U.S. application Ser. No. 17/106,404, filed Nov. 30, 2020, which is a continuation of and claims the benefit of priority under 35 U.S.C. § 120 from U.S. application Ser. No. 16/661,405 filed Oct. 23, 2019 (now U.S. Pat. No. 10,904,991 issued Jan. 26, 2021), which is continuation of U.S. application Ser. No. 16/200,761 filed Nov. 27, 2018 (now U.S. Pat. No. 10,512,141 issued Dec. 17, 2019), which is a continuation of U.S. application Ser. No. 15/448,272 filed Mar. 2, 2017 (U.S. Pat. No. 10,154,572 issued Dec. 11, 2018), and claims the benefit of priority under 35 U.S.C. § 119 from Japanese Patent Application Nos. 2016-039549 filed Mar. 2, 2016 and 2017-036417 filed Feb. 28, 2017, the entire contents of each of which are incorporated herein by reference.

BACKGROUND

Technical Field

The present invention relates to an apparatus, system, and method of monitoring, and a non-transitory recording medium.

Background Art

The monitoring systems may have complex installation and require dedicated wiring.

SUMMARY

Example embodiments of the present invention include an apparatus, system, and method of remotely monitoring, which receives, from an operation terminal, identification information and location information of a location of one or more lamps, stores, in a memory, the received identification information and the received location information in association with each other for the one or more lamps, updates log information regarding a log of a lighting condition of the one or more lamps, in response to an indication that an electric circuit of the one or more lamps is energized for the one or more lamps, and sends monitoring information corresponding to the log information of the electric circuit of the one or more lamps for display.

Example embodiments of the present invention include a control program that causes one or more processors to perform a method of remotely monitoring.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 4A, 4B, and 4C are diagrams illustrating various tables stored in a remote monitoring server as an embodiment of the present invention:

Figure 1:
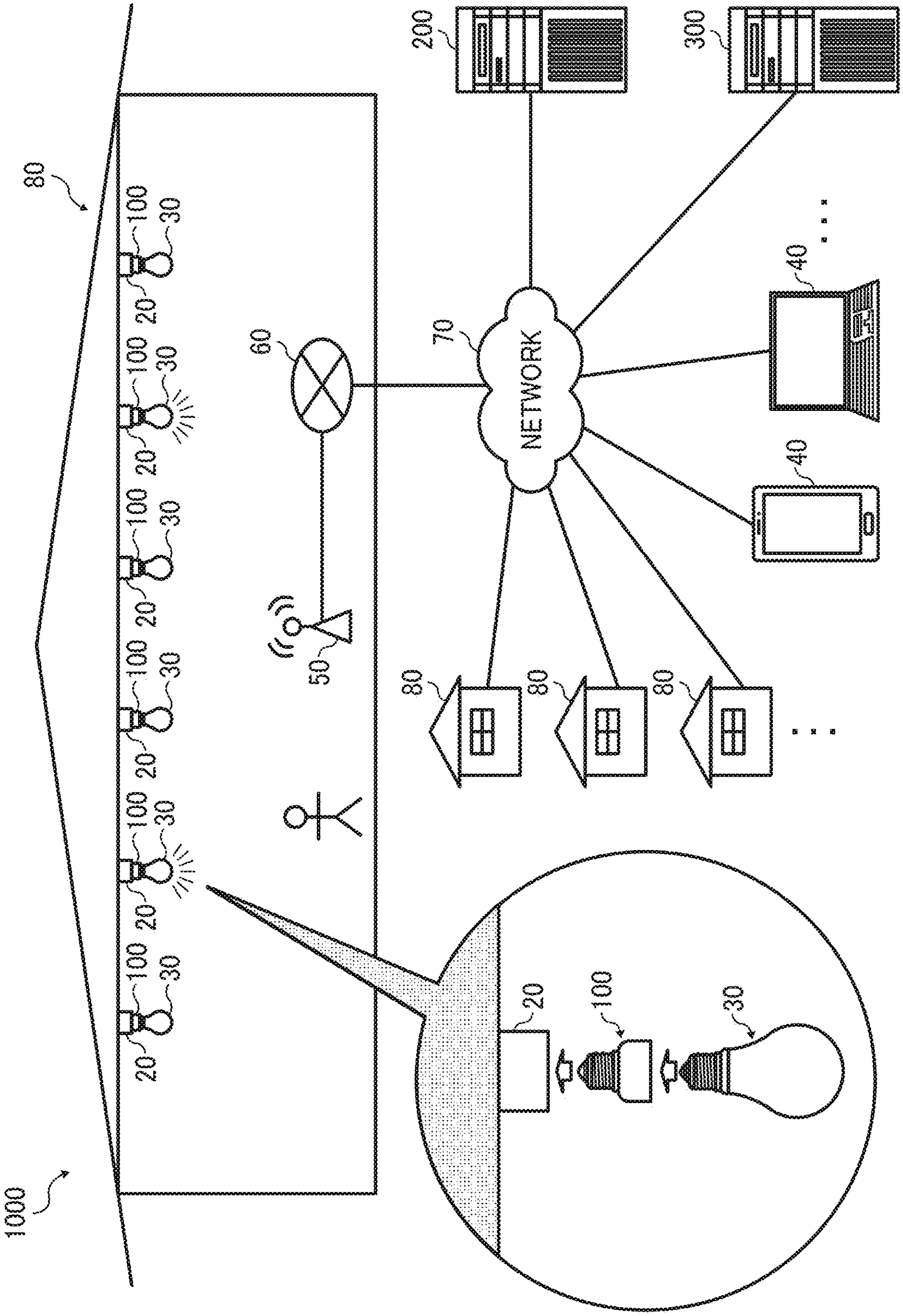
FIG. 1 is a diagram illustrating a system configuration of a remote monitoring system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

As illustrated in FIG. 1, a remote monitoring system 1000 in this embodiment includes a remote monitoring server 200 that resides on a network 70 such as the Internet and multiple adapters 100.

Referring to FIG. 1, in general house 80, a plurality of lighting sockets 20 (hereinafter referred to as a socket 20) each for supplying commercial power to a corresponding lighting device 30 such as a light (or lamp) 30 are placed at various areas. In this embodiment, the adapter 100 has an electric configuration equivalent to that of a general light socket adapter, and fits into both a lamp holder of the socket 20 and a base of the light 30 to electrically connect the socket 20 and the light 30.

In FIG. 1, the light 30 is implemented by a light bulb with a screw base (e.g., an electric light bulb, a light emitting diode (LED) light bulb, and a light-bulb fluorescent lamp etc.). Alternatively, the adapter 100 may be connected to a socket of the light 30 with an engagement base (e.g., various fluorescent lamp and LED lamp etc.). In such case, the adapter 100 has a structure compatible with such engagement base. In the below description, the adapter 100 compatible with the light-bulb light 30 (hereinafter referred to as the light bulb 30) is taken as an example.

In this embodiment, the adapter 100 includes a wireless communication interface (wireless communication unit 10) in compliance with predetermined wireless specifications and wireless standards such as Wi-Fi (registered trademark) and Bluetooth (registered trademark) etc. to establish wireless communication with an access point 50 of wireless LAN in the house 80, and communicably connect to the remote monitoring server 200 via a wired LAN 60 connected to the access point 50 and the network 70.

The remote monitoring server 200 in this embodiment is an information processing apparatus provided with a database function and web application server function. The remote monitoring server 200 stores information received from each of the adapters 100 via the network 70, performs various operations based on the stored information, and provides results of performing those operations to a user terminal 40 implemented by a personal computer (PC) and smartphone etc. and a predetermined external server 300 via the network 70.

The remote monitoring system 1000 in this embodiment is described above. A detailed configuration of the adapter 100 in this embodiment is described below with reference to FIGS. 2A and 2B.

Figure 2A:
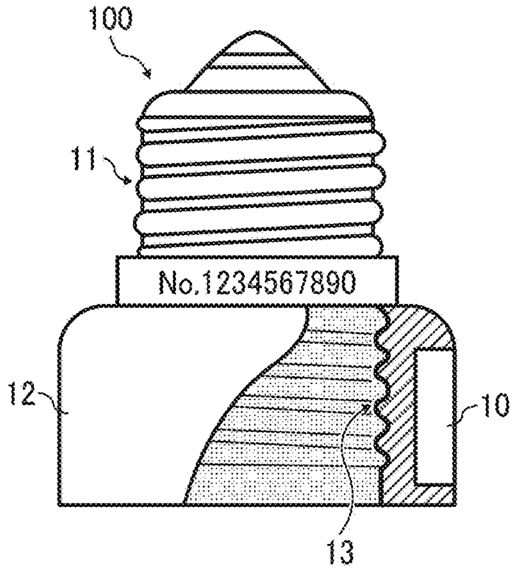
FIGS. 2A and 2B are diagrams illustrating an adapter as an embodiment of the present invention.

FIG. 2A is a diagram illustrating an exterior appearance of the adapter 100 in this embodiment. In FIG. 2A, a part of the adapter 100 is cutaway for convenience of explanation. As illustrated in FIG. 2A, the adapter 100 includes a base 11 and a holder unit 12. The holder unit 12, which has a substantially-cylindrical shape, is made of an insulator such as synthetic resin. Here, the base 11 screws in a holder of the socket 20. The holder unit 12 includes a holder 13 to which the base of the light bulb 30 is screwed. The adapter 100 is assigned with a serial number for uniquely identifying the adapter 100, which is impressed at an appropriate position on the surface of the adapter 100. The holder unit 12 in the adapter 100 includes a wireless communication unit 10 that performs wireless communication with an access point 50.

Figure 2B:
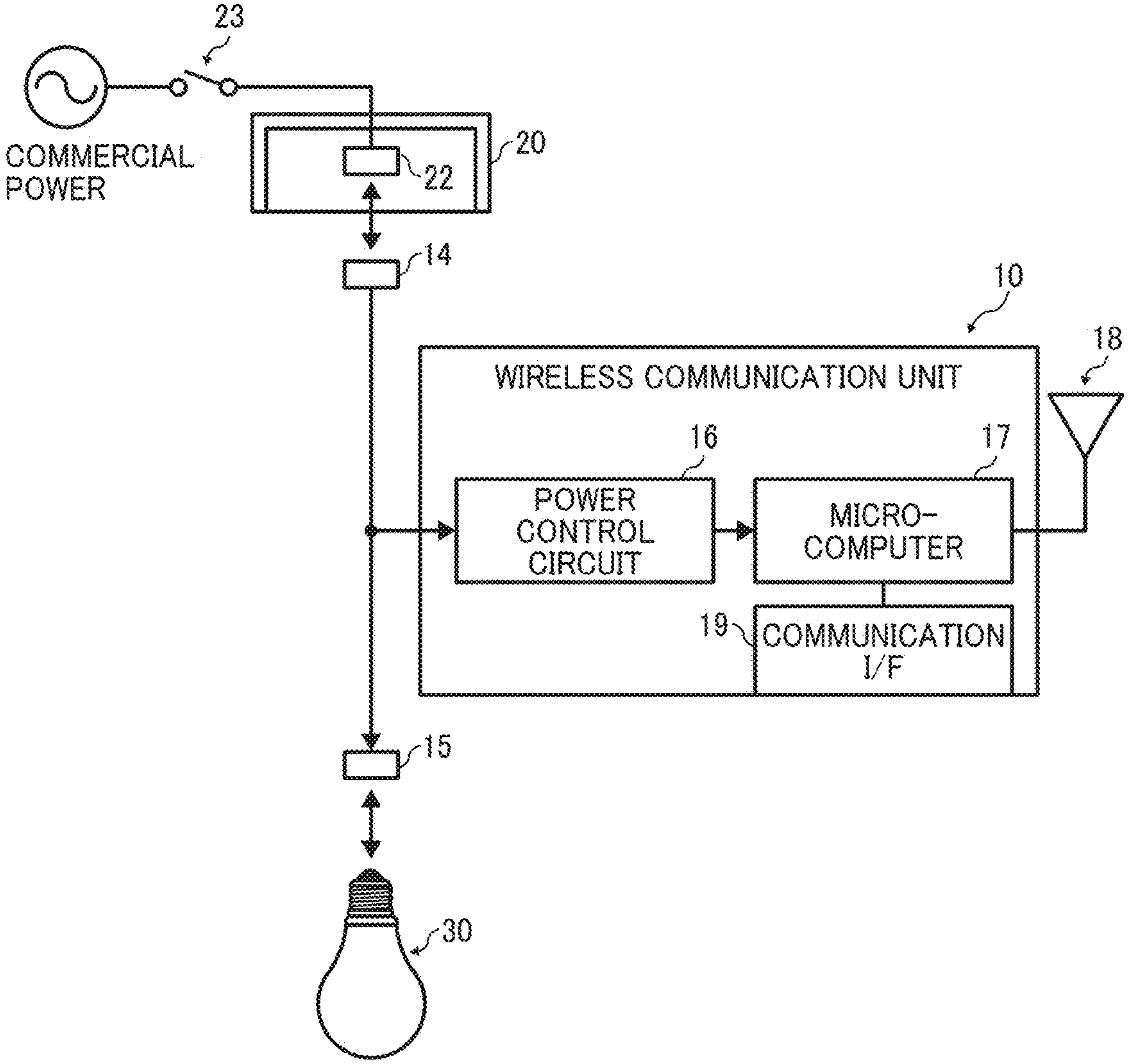

FIG. 2B is a diagram illustrating a hardware configuration of the wireless communication unit 10 included in the adapter 100. As illustrated in FIG. 2B, the wireless communication unit 10 includes a power supply control circuit 16, a microcomputer 17, an antenna 18, and a communication interface 19.

In this embodiment, a terminal 14 of the base 11 contacts a terminal 22 of the socket 20, and a terminal 15 of the holder unit 12 contacts the terminal of the base of the light bulb 30 to form an electric circuit between the terminal 22 of the socket 20 and the light bulb 30. In the wireless communication unit 10, as a switch 23 for turning on or off the light bulb 30 is turned on, commercial power is supplied to both the socket 20 and the power supply control circuit 16. As the switch 23 is turned off, commercial power to both the socket 20 and the power supply control circuit 16 is shut down.

Here, the power supply control circuit 16 converts a voltage supplied from a commercial power supply into a DC power voltage having a predetermined voltage value, and supplies the DC power voltage to the microcomputer 17. The microcomputer 17, which is operated by the DC power voltage supplied from the power supply control circuit 16, transmits or receives wireless signals via an antenna 18.

In addition, the microcomputer 17 receives information input via a communication interface 19. Examples of specification of the communication interface 19 include Universal Serial Bus (USB) and Near Field Communication (NFC). The wireless communication unit 10 may include both USB interface and NFC USB interface, for example.

Figure 3:
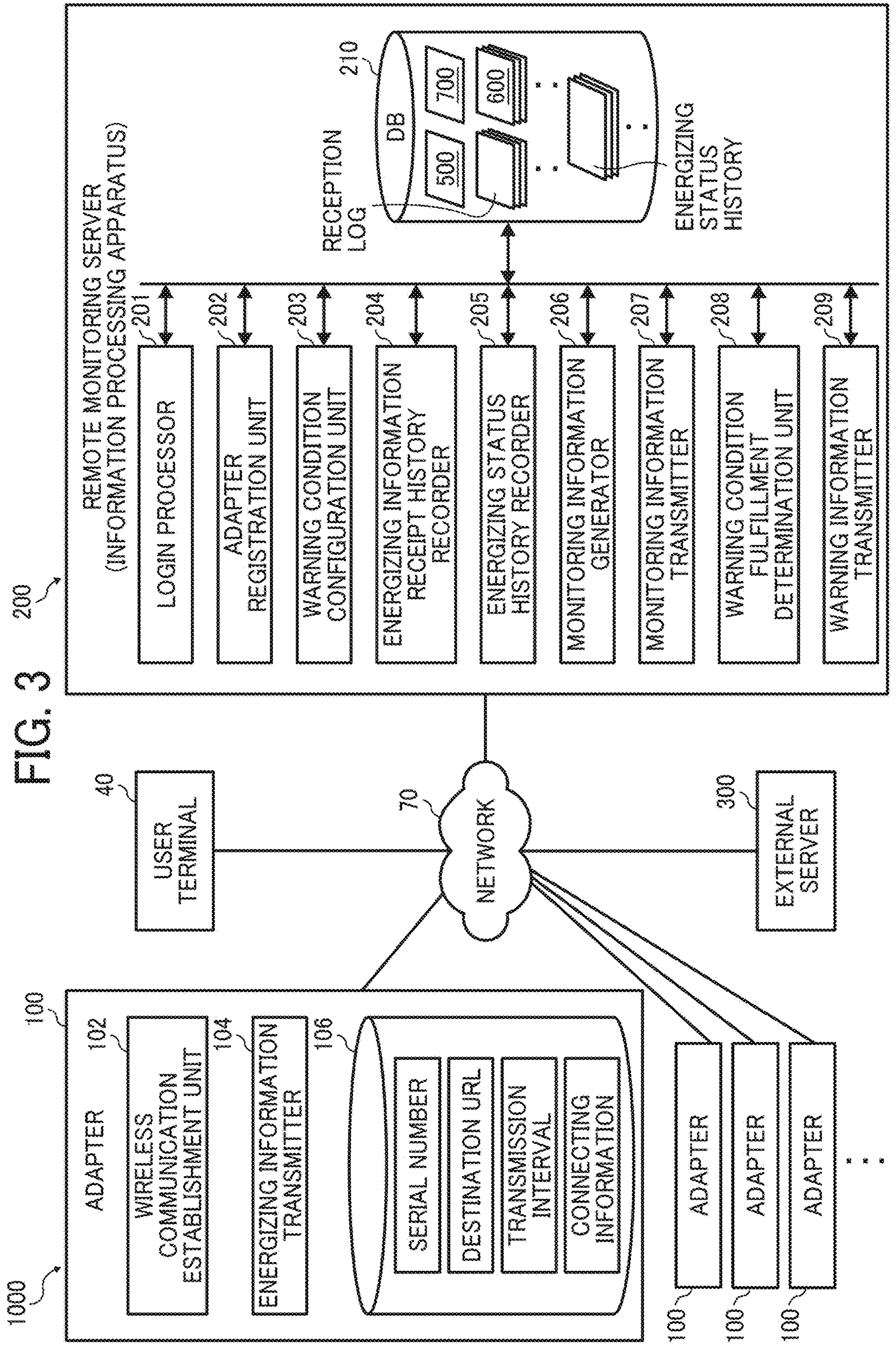
FIG. 3 is a diagram illustrating functional blocks of the remote monitoring system as an embodiment of the present invention.

The configuration of the adapter 100 in this embodiment is described in detail above. A functional configuration of the adapter 100 and the remote monitoring server 200 is described below with reference to a functional block diagram illustrated in FIG. 3.

The adapter 100 includes a wireless communication establishment unit 102, an energizing information transmitter 104, and a storage area 106.

The wireless communication establishment unit 102 searches for an access point of wireless LAN and establishes wireless communication with the access point that is found While electric power is supplied to the socket 20 connected to the adapter 100, the energizing information transmitter 104 transfers energizing information indicating that power is supplied to the socket 20 to the remote monitoring server 200, for example, periodically.

The storage area 106 is implemented by a nonvolatile memory such as a flash memory of the microcomputer 17. The storage area 106 stores a serial number (production serial number) of the device itself, URL of the remote monitoring server 200 (destination information) as a destination of the energizing information described above, an interval of transferring energizing information, and connection information for connecting to the wireless LAN in the house to be monitored (such as ESSID of the access point 50 and a cryptography key).

In this embodiment, the microcomputer 17 operates as the functional units described above according to execution of a program stored in any desired memory, using hardware illustrated in FIG. 2B.

The remote monitoring server 200 includes a login processor 201, an adapter registration unit 202, a warning condition configuration unit 203, an energizing information reception log recorder 204, an energizing state log recorder 205, a monitoring information generator 206, a monitoring information transmitter 207, a warning condition fulfillment determination unit 208, a warning information transmitter 209, and a database 210.

The login processor 201 performs login operation in response to a request to log in from the user terminal 40.

The adapter registration unit 202 registers the adapter 100 or deregisters the adapter 100 that has been registered.

The warning condition configuration unit 203 configures a warning condition input from the user.

The energizing information reception log recorder 204 records a log of reception of energizing information, which is periodically transferred by the adapter 100.

The energizing state log recorder 205 records a log indicating whether or not electric power is supplied to the socket 20 (hereinafter referred to as energizing state log) based on the energizing information received from the adapter 100. That is, the log indicates whether or not the electric circuit of the light bulb 30 is energized, based on an indication that the electric circuit of the light bulb 30 is energized, for one or more of the registered adapters 100 connected to the light bulbs 30.

The monitoring information generator 206 generates monitoring information based on the energizing state log recorded by the energizing state log recorder 205.

The monitoring information transmitter 207 transfers monitoring information in response to a request from the user or the external server 300.

The warning condition fulfillment determination unit 208 determines whether or not a preset warning condition is satisfied based on the energizing state log recorded by the energizing state log recorder 205.

The warning information transmitter 209 transfers warning information to a preregistered destination when it is determined that the warning condition is satisfied.

The database 210 stores a user information management table 500 that includes user information for each user, an adapter information management table 600 that includes adapter information for each of the registered adapters 100, a warning setting information management table 700 that stores waning setting information for each user, a log of time when the energizing information is received for each of the registered adapters 100 (hereinafter referred to as a reception log), and an energizing state log for each of the registered adapters 100. Here, FIG. 4A is a diagram illustrating the user information management table 500, FIG. 4B is a diagram illustrating the adapter information management table 600, and FIG. 4C is a diagram illustrating the warning setting information management table 700.

Figure 13:
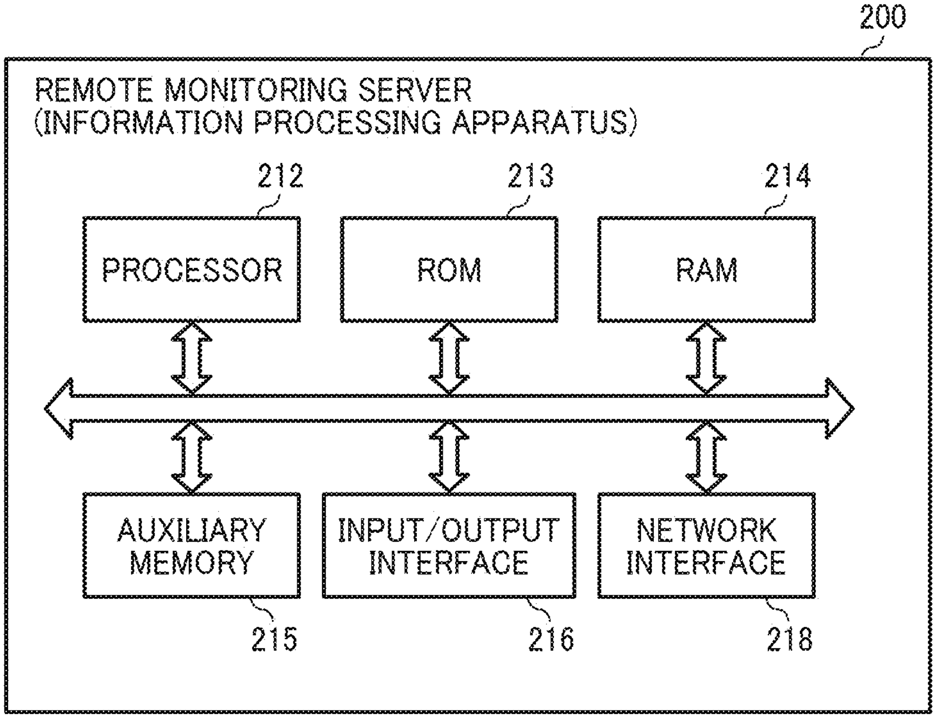
FIG. 13 is a diagram illustrating a hardware configuration of the remote monitoring server as an embodiment of the present invention.

In this embodiment, a processor 212 (FIG. 13) of the remote monitoring server 200 operates as the functional units described above according to execution of a program stored in any desired memory such as a RAM 214 (FIG. 13).

The functional configuration of the adapter 100 and the remote monitoring server 200 is described above. An operation performed by the remote monitoring system 1000 in this embodiment is described below.

Figure 5:
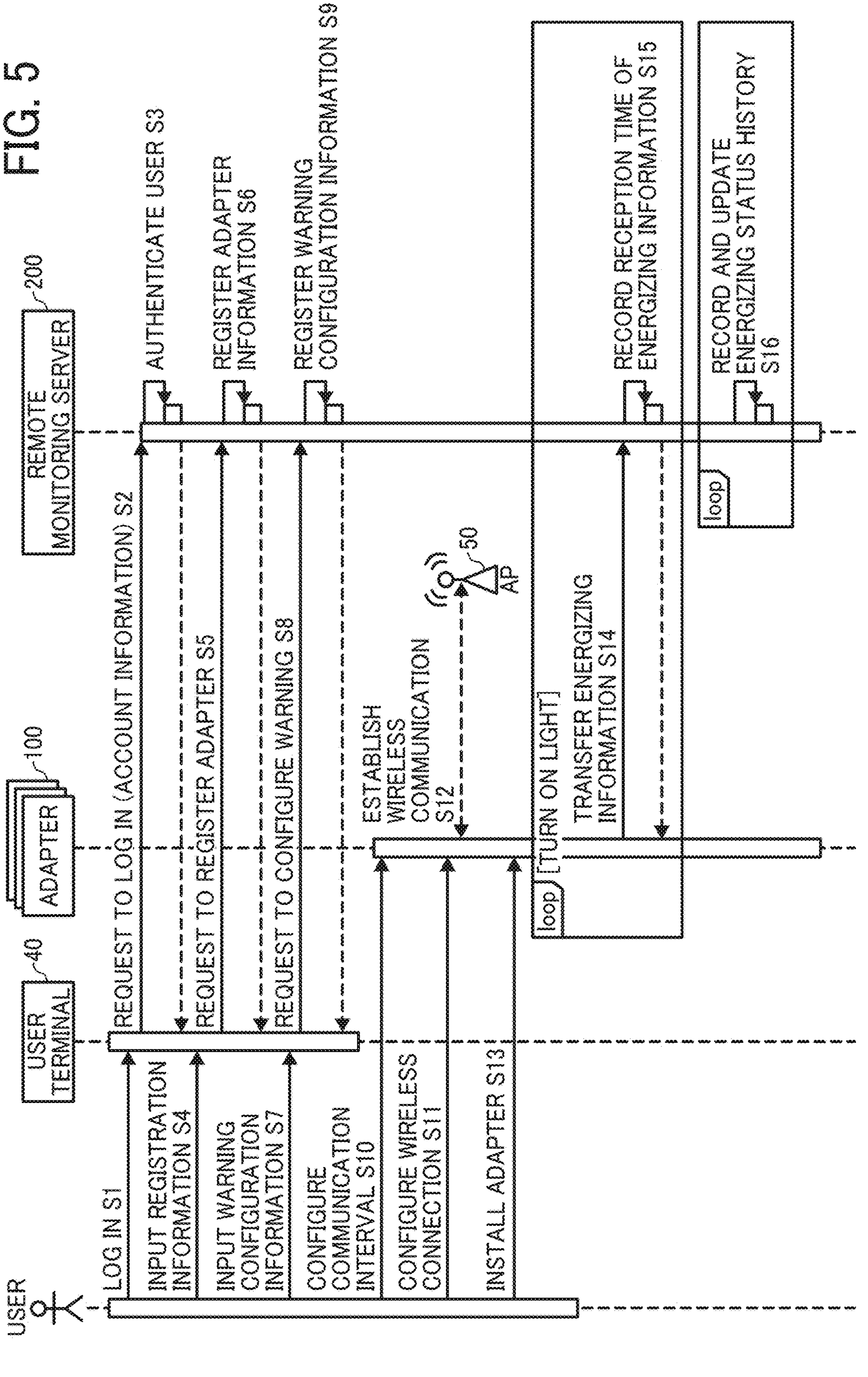
FIG. 5 is a sequence diagram illustrating operation performed by the remote monitoring system as an embodiment of the present invention.

The sequence diagram of FIG. 5 illustrates an example case in which a user of the system in this embodiment newly installs the adapter 100 in a house where a person to be observed (such as elderly who lives alone) lives (hereinafter referred to as a house), and starts operating the system.

Figure 6A:
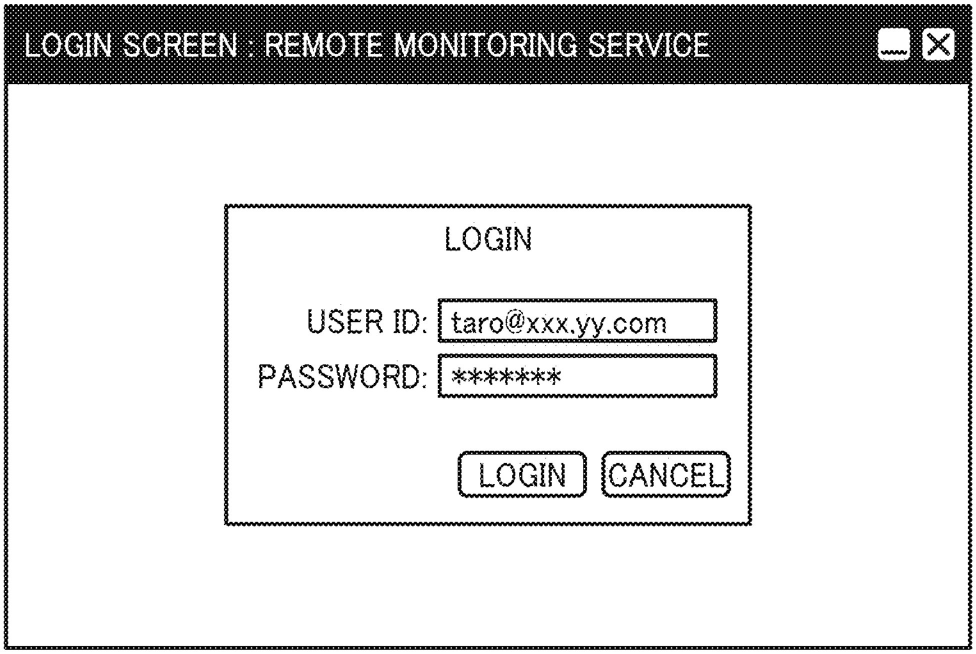
FIGS. 6A and 6B are diagrams illustrating a service screen displayed by the remote monitoring system as an embodiment of the present invention.

First, according to user operation, the user terminal 40 accesses a web service "remote monitoring service" provided by the remote monitoring server 200. Through a login screen displayed to the user (illustrated in FIG. 6A), the user inputs account information and selects the "login" key at S1. According to the user input, the user terminal 40 sends a login request including the account information input by the user to the remote monitoring server 200 (S2). The login processor 201 of the remote monitoring server 200 performs user authentication based on a match between the account information received from the user terminal 40 and account information registered in the user information management table 500 (illustrated in FIG. 4A) at S3. Based on the match, the login processor 201 allows the authenticated user to log in.

Figure 6B:
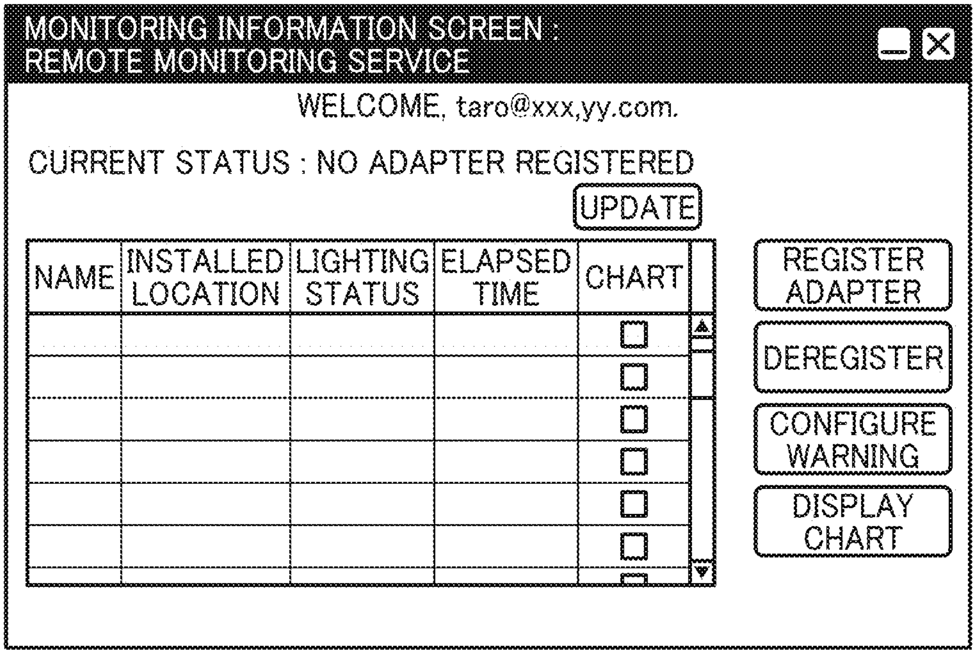
Figure 7A:
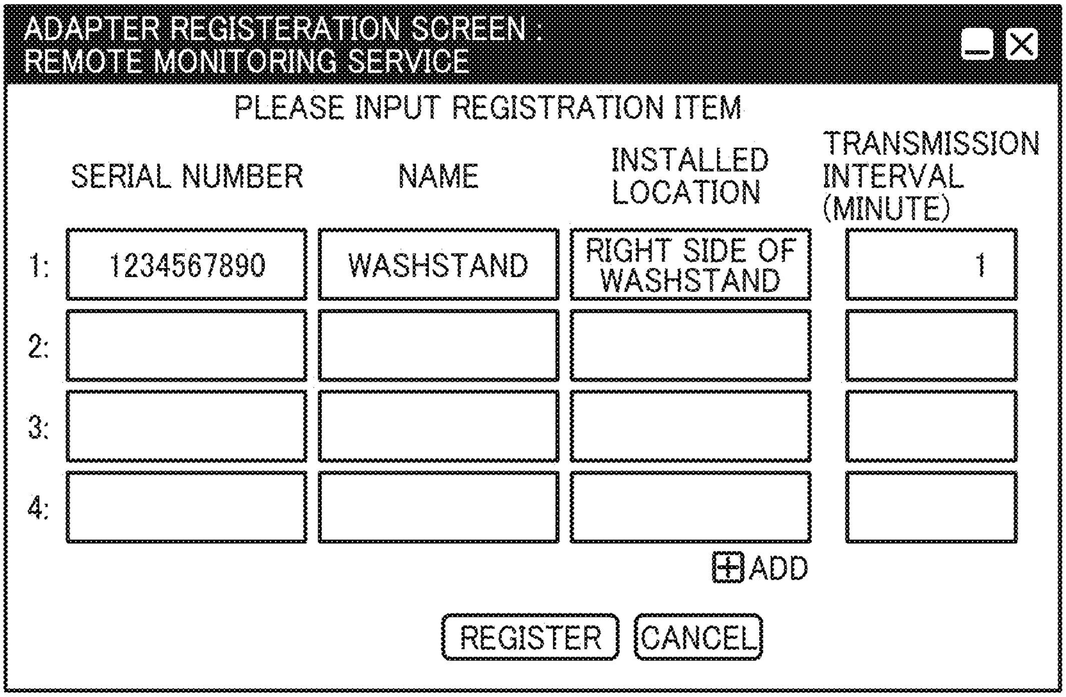
FIGS. 7A and 7B are diagrams illustrating a service screen displayed by the remote monitoring system as an embodiment of the present invention.

In this case, the remote monitoring server 200 sends a monitoring information screen illustrated in FIG. 6B to the user terminal 40 that successfully logs in, and the user terminal 40 displays the monitoring information screen. In response, as the user selects a "register adapter" key displayed on the monitoring information screen, the monitoring information screen transitions to an "adapter registration screen" illustrated in FIG. 7A.

In response, the user inputs adapter information (1) to (4) shown below regarding one or more adapters 100 to be registered in an input form displayed on the "adapter registration screen" (S4).

(1) A serial number of the adapter 100

(2) A name of the adapter 100

(3) A location where the adapter 100 is installed (4) A transmission time interval ("transmission interval") within which to transmit energizing information by the adapter 100

Regarding information (1) described above, the user inputs a serial number inscribed on the surface of the adapter 100. Regarding information (2) described above, the user inputs an arbitrary name for identifying the adapter 100 (such as an arbitrary character string that reminds of the location where the adapter 100 is installed). Regarding information (3) described above, the user inputs an arbitrary character string for identifying the location where the adapter 100 is installed.

Regarding information (4) described above, the user inputs a transmission time interval within which to transmit energizing information in accordance with application of the lighting that the adapter 100 connects and desired monitoring accuracy. More specifically, the lights located at areas including a lavatory, washstand, bedroom, and front door are usually turned on for a relatively short period of time. Therefore, the transmission interval for the adapters 100 installed at those areas may be set to about one minute. By contrast, the lights located at areas including a living room and a dining room are turned on for a relatively long period of time. Therefore, the transmission interval for the adapters 100 installed at those areas may be set to about 10 minutes.

Next, in response to selecting the "register" key (FIG. 7A) by user operation, the user terminal 40 transmits an adapter registration request including the input adapter information (1) to (4) described above to the remote monitoring server 200 (S5). In response, the adapter registration unit 202 of the remote monitoring server 200 newly creates the adapter information management table 600 (illustrated in FIG. 4B) for the login user and registers the adapter information (1) to (4) included in the adapter registration request received from the user terminal 40 in corresponding fields on the created table.

Figure 7B:
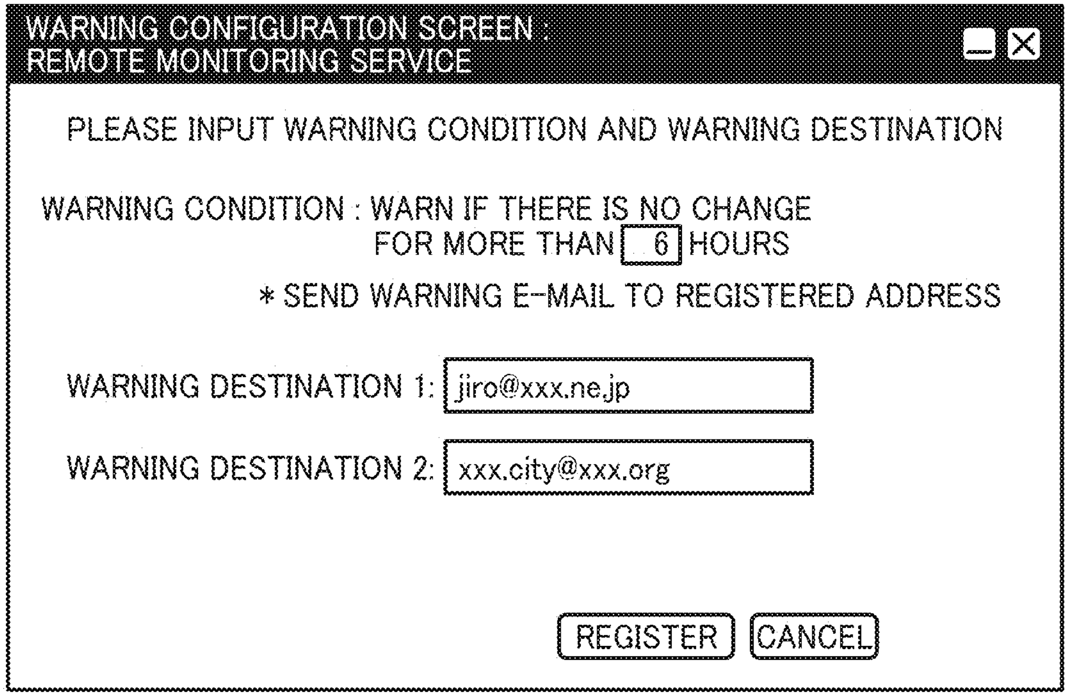

Then, the user terminal 40 displays the monitoring information screen illustrated in FIG. 6B again. In response to a user selection of a "configure warning" key, the monitoring information screen transitions to a warning configuration screen illustrated in FIG. 7B. In the remote monitoring service according to this embodiment, if the energizing state of the socket 20 connected to the adapter 100 remains the same for at least a threshold time period, the remote monitoring server 200 transmits a warning e-mail to a preregistered email address. In this case, the user inputs the threshold time period as the warning condition and an intended email address as the warning destination in the input form displayed on the warning configuration screen (S7). Examples of destinations of the warning e-mail are a user himself/herself, a family member who lives near the person to be observed, a welfare organization, a personal physician, and a security company etc.

Next, in response to a user selection of the "register" key (FIG. 7B), the user terminal 40 transmits a warning configuration request including the input warning condition and warning destination to the remote monitoring server 200 (S8). In response, the warning condition configuration unit 203 of the remote monitoring server 200 creates a new record for the login user in the warning setting information management table 700 (illustrated in FIG. 4C) and registers the warning condition and the warning destination registration information included in the warning configuration request received from the user terminal 40 in corresponding fields in the created record (S9).

Next, the user inputs and sets the same value as the transmission interval input at S4 described above to the wireless communication unit 10 of each of the registered adapters 100 via the communication interface 19 at S10. In this case, the configured transmission interval is stored in the storage area 106.

Next, the user inputs and configures connecting information such as ESSID and cryptography key etc. required for connecting to the access point 50 located at house using wireless communication to the wireless communication unit 10 in each of the registered adapters 100 via the communication interface 19 at S11. In this case, the configured connecting information is stored in the storage area 106.

Figure 8A:
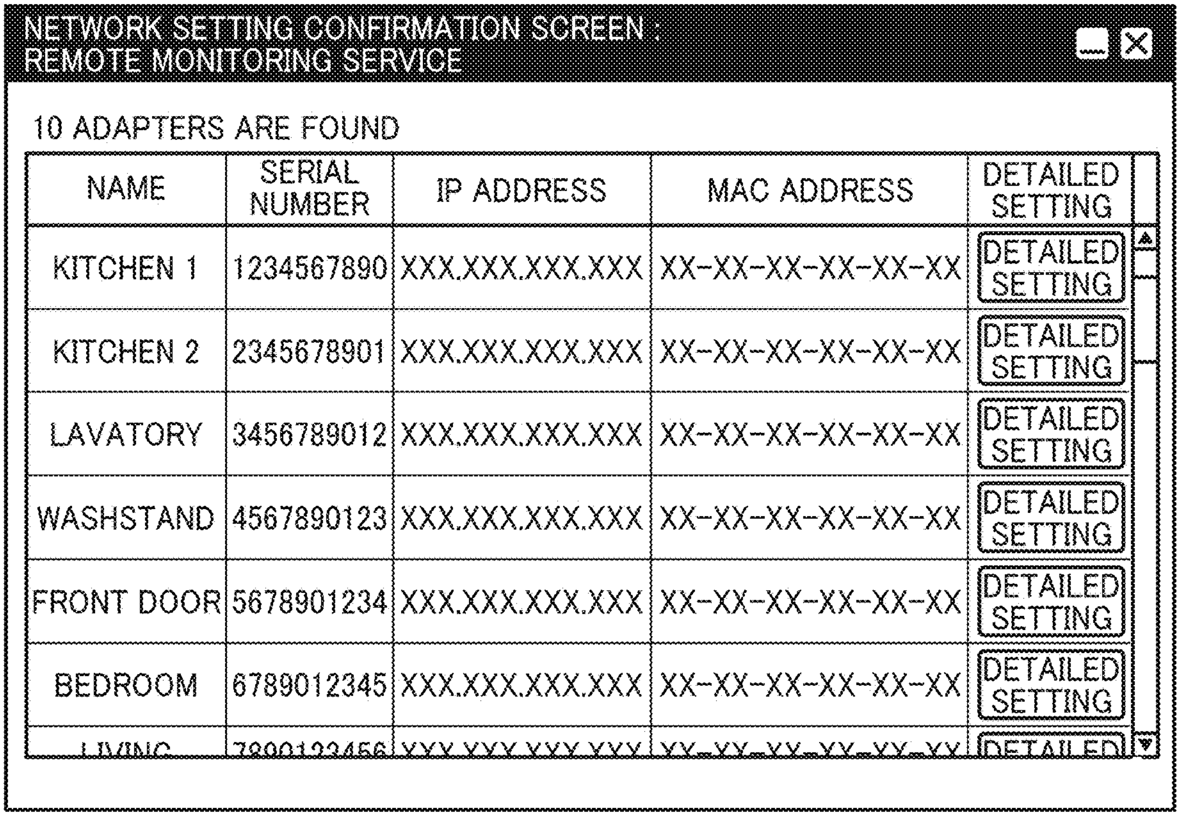
FIGS. 8A and 8B are diagrams illustrating a service screen displayed by the remote monitoring system as an embodiment of the present invention.
Figure 8B:
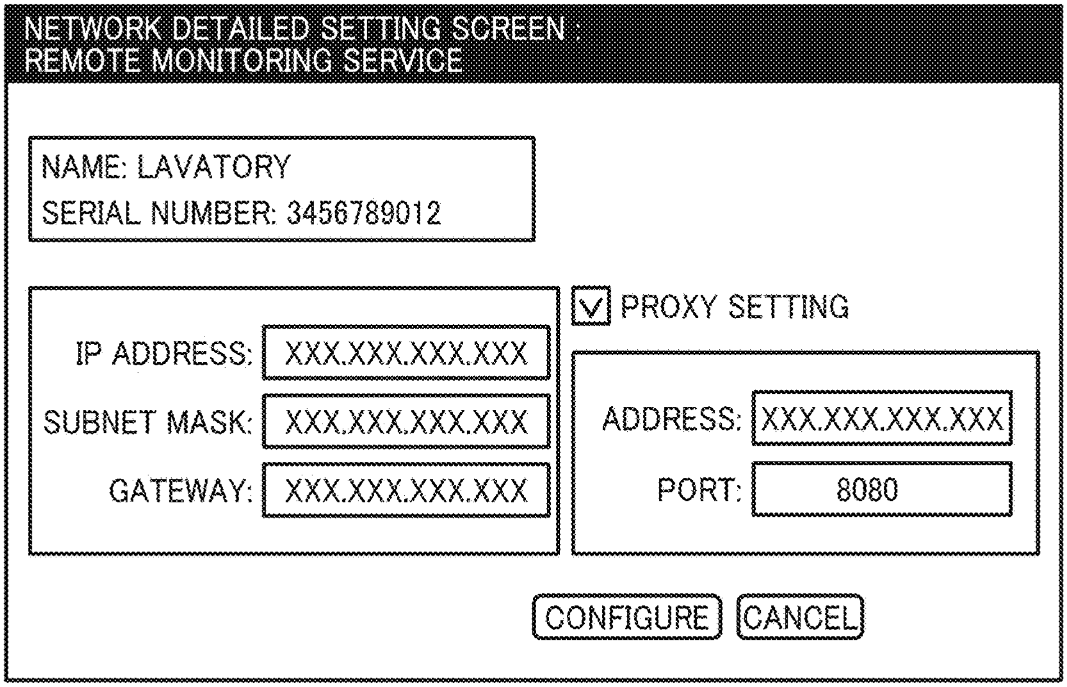

After configuring wireless connection, the wireless communication establishment unit 102 in the adapter 100 establishes wireless communication with the access point 50 located at house at S12. It should be noted that, in this embodiment, after finishing configuring wireless connection of the registered adapter 100, the user can check the content of the configured wireless connection on a network setting confirmation screen illustrated in FIG. 8A. As illustrated in FIG. 8A, on the network setting confirmation screen, names, serial numbers, IP addresses, and MAC addresses of the adapters 100 that establish wireless communication with the access point 50 are listed. In response to selecting a "detailed setting" key displayed on the list by user operation, the network setting confirmation screen transitions to a network detailed setting screen illustrated in FIG. 8B. The network detailed setting screen accepts detailed setting for the network configuration of the adapter 100 from a user input.

Next, the bases 11 of the registered adapters 100 are each located at registered areas by user operation (S13). More specifically, after removing the light bulb 30 from the socket laid out at the registered location, the base 11 of the adapter 100 whose installed location is registered is screwed into the lamp holder of the socket 20, and the base of the removed light bulb 30 is screwed into the lamp holder 13 of the holder unit 12 of the adapter 100. As a result, the socket 20 is electrically connected to the light bulb 30.

Next, as the switch 23 of the socket 20 connected to the adapter 100 located at each area in the house is turned on to supply electric power to the socket 20, the microcomputer 17 of the adapter 100 activates with electric power supplied from the power supply control circuit 16 (see FIG. 2B). In response, the energizing information transmitter 104 of the adapter 100 generates energizing information including its own serial number and transfers the generated energizing information to the remote monitoring server 200 at the transmission interval stored in the storage area 106 (S14). Subsequently, the energizing information transmitter 104 repeats S14 while power is supplied to the adapter 100 (that is, while power is supplied to the socket 20).

Figure 9A:
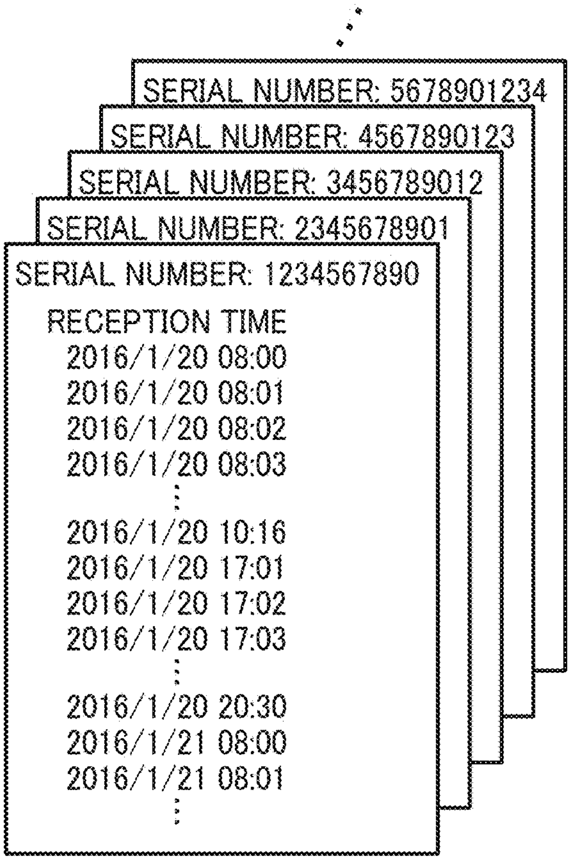
FIGS. 9A and 9B are diagrams illustrating an energizing information reception log and an energizing state log as an embodiment of the present invention.

The energizing information reception log recorder 204 in the remote monitoring server 200 records the date and time every time the energizing information is received from the adapter 10 in the reception log at S13. FIG. 9A is a diagram illustrating the reception log stored for each serial number.

Concurrently with the operation that the energizing information reception log recorder 204 updates the reception log for each serial number, based on the reception log for each adapter 100, the energizing state log recorder 205 in the remote monitoring server 200 determines an energizing state indicating whether or not power is supplied to the socket 20 connected to the adapter 100 (i.e., whether or not the socket 20 is turned on or off). Based on the determination result, the energizing state log recorder 205 repeats updating the energizing state log for each adapter 100 stored in the database 210 at S16.

Figure 9B:
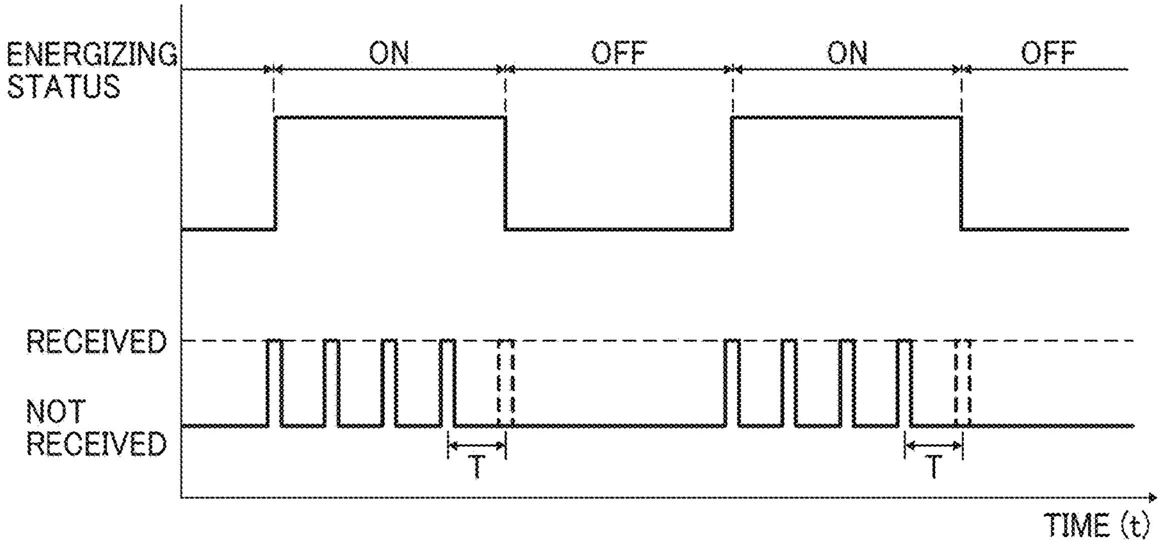

Regarding this operation, more specifically, based on FIG. 9B, when the energizing state log recorder 205 receives the energizing information from the adapter 100, the energizing state log recorder 205 determines that the energizing state is "on". After receiving the energizing information, when a threshold time T elapses without further receiving next energizing information, the energizing state log recorder 205 determines that the energizing state is "off". The energizing state log recorder 205 repeats this determination process to output determination results. The change in determination results over time is recorded and updated as the energizing state log. Here, the threshold time T may be set to a time interval, which is obtained by adding a margin to the transmission interval set for each adapter 100 (illustrated in FIG. 4B).

Figure 10:
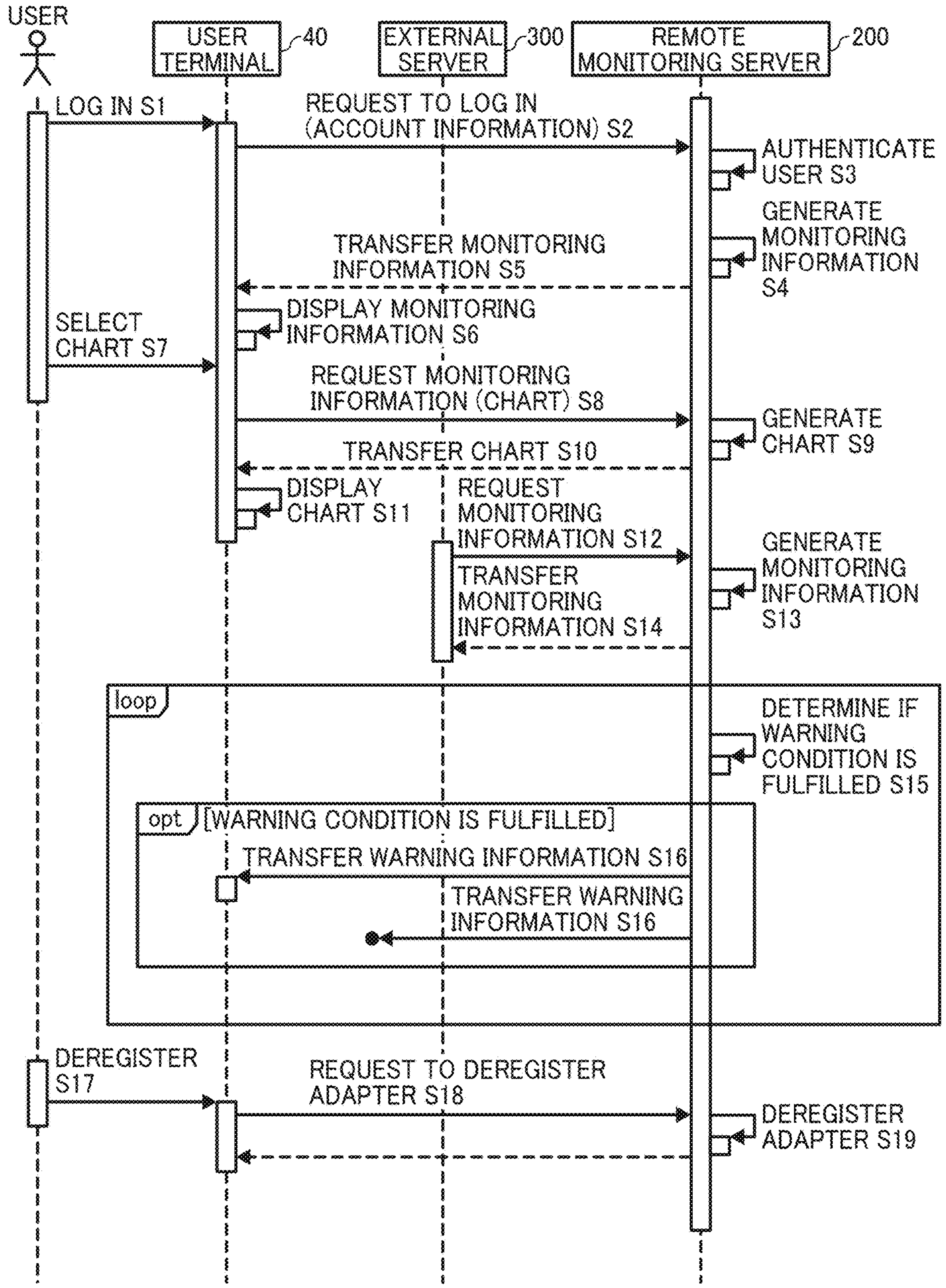
FIG. 10 is a sequence diagram illustrating operation performed by the remote monitoring system as an embodiment of the present invention.

The operation of newly installing the adapter 100 in the house and operating the adapter 100 is described above. The sequence diagram of FIG. 10 illustrates an operation to be performed when the user browses the monitoring information.

As a user who wants to check the current state of the person to be observed logs into the remote monitoring service at S1, the user terminal 40 transmits a login request to the remote monitoring server 200 at S2. In response, the login processor 201 in the remote monitoring server 200 performs user authentication at S3, and the user is allowed to log in.

Next, the monitoring information generator 206 in the remote monitoring server 200 generates monitoring information for the login user at S4. More specifically, the monitoring information generator 206 reads the energizing state log of one or more adapters 100 registered by the login user from the database 210. Based on the read energizing state log, the monitoring information generator 206 acquires a current "energizing state" of the light bulb 30 connected to each adapter 100 and an "elapsed time" from the time when it is transitioned to the current energizing state. Subsequently, a list of the energizing state and the elapsed time acquired for each adapter 100 is generated as the monitoring information.

Figure 11A:
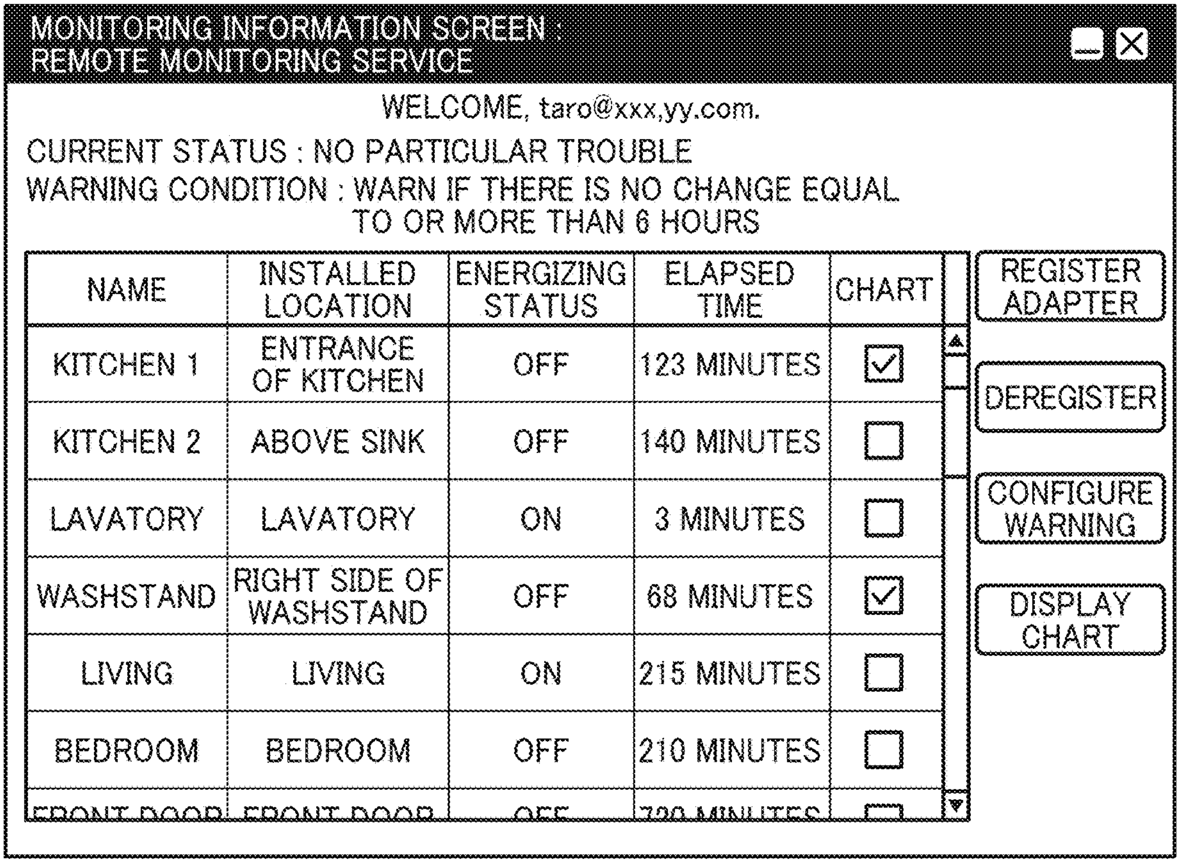
FIGS. 11A and 11B are diagrams illustrating a service screen displayed by the remote monitoring system as an embodiment of the present invention.

Next, the monitoring information generator 206 sends the generated monitoring information to the login user terminal 40 at S5. In response, the user terminal 40 displays a monitoring information screen including the received monitoring information at S6. FIG. 11A is a diagram illustrating the monitoring information screen displayed at S6. As illustrated in FIG. 11A, the monitoring information screen lists, for each adapter 100 registered by the user, the name, installed area, energizing state, and elapsed time as the monitoring information for display.

In this case, the user selects one or more boxes each corresponding to the name to be checked from among checkboxes in the list displayed on the monitoring information screen. In response to the user selection of one or more boxes and a "display chart" key at S7, the user terminal 40 transfers a monitoring information request including the serial number of each adapter 100 whose name is selected by user operation to the remote monitoring server 200 at S8. In response, the monitoring information generator 206 reads the energizing state log associated with the serial number of each adapter 100 included in the monitoring information request from the database 210. The monitoring information generator 206 generates, for each name that has been checked, a percentage bar chart of the energizing state log from 0:00 a.m. to the current time on that day as the monitoring information at S9.

Figure 11B:
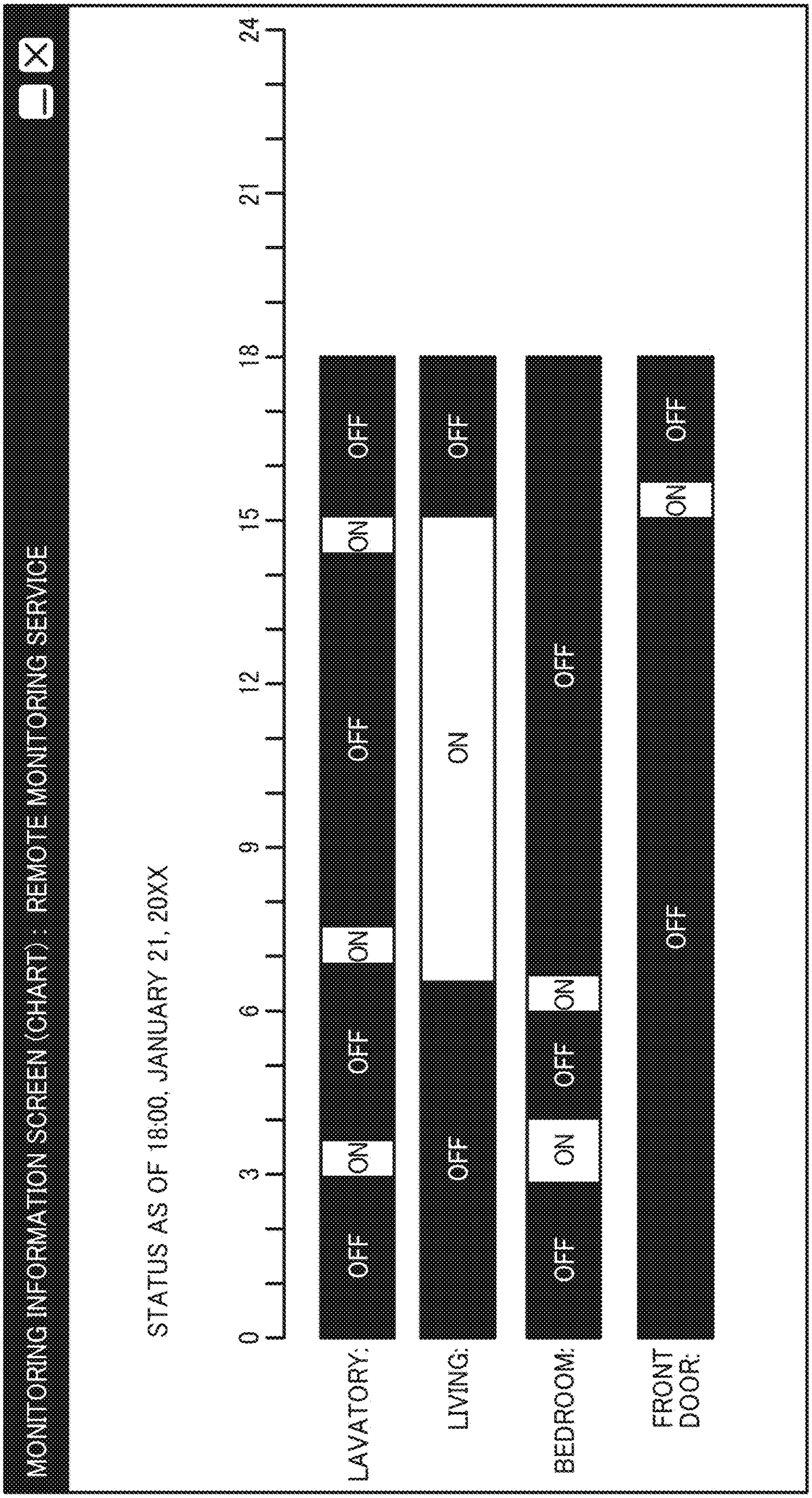

Next, the monitoring information transmitter 207 sends the generated charts (i.e., the generated monitoring information) to the user terminal 40 at S10. The user terminal 40 displays a monitoring information screen including the received charts at S11. FIG. 11B is a diagram illustrating the monitoring information screen displayed at S11. As illustrated in FIG. 11B, the monitoring information screen displays, as the monitoring information, percentage bar charts of the energizing state log corresponding to four names (i.e., "lavatory", "living room", "bedroom", and "front door") selected by user operation.

As illustrated in FIG. 11B, the charts each visualizing the energizing state log of the socket 20 located at each of various areas in the house obviously reflects activities of the person to be observed. Referring to the charts, the user is able to predict the activities of the person to be observed, characteristics of the person to be observed that the user is aware of, and daily behavioral pattern of the person to be observed, with high accuracy.

For example, with reference to the charts illustrated in FIG. 11B, it is possible to predict activities of the person to be observed (e.g., an elderly person who lives alone) as described below. (1) The person to be observed goes to the lavatory around 3:00 a.m. (The person to be observed has a tendency toward frequent urination.) (2) After returning from the lavatory, the person to be observed does not go to sleep for about an hour. (The person to be observed has trouble getting to sleep.) (3) The person to be observed wakes up around 6:00 a.m. and moves to the living room. (The person to be observed practices a custom of watching a TV drama every morning.) (4) The person to be observed goes out around 3:0) p.m. (The person to be observed practices a custom of using the lavatory before going out.)

In the description above, it is assumed that a target that the monitoring information is provided is an individual user. However, the target of the system that the monitoring information is provided is not limited to the user in this embodiment. For example, in the system in this embodiment, a web API of the remote monitoring server 200 may be published. In such case, the monitoring information may be transmitted in response to receiving the request for monitoring information from the external server 300. Example organizations that operate the external server 300 are a security company and a medical institution etc. In this case, in response to transferring the request for monitoring information by the external server 300 at S12, based on the information stored in the database 210 such as the reception log and energizing state log etc., the monitoring information generator 206 generates monitoring information requested by the external server 300 at S13, and the monitoring information transmitter 207 transfers the generated monitoring information to the external server 300 at S14.

On the other hand, the warning condition establishment determination unit 208 in the remote monitoring server 200 continuously monitors the energizing state log of each adapter 100 registered by the user and repeats determining whether or not the warning condition configured by the user is met at S15. More specifically, the remote monitoring server 200 periodically determines, for the light bulbs 30 connected to all adapters 100 registered by the user, whether or not an elapsed time period during when the energizing state stays at the same state reaches a time period that is configured as the configured warning condition (i.e., time). When the warning condition establishment determination unit 208 determines that the waning condition is met, the warning information transmitter 209 transfers warning information to the warning destination preregistered by the user using e-mail at S16.

In alternative to or in addition to sending warning information by e-mail, the remote monitoring server 200 may transmit warning information to the user terminal 40 that logs into the remote monitoring service by push notification. In alternative to or in addition to a policy that the warning information is transmitted when the condition that the energizing states of all sockets 20 remain unchanged, the remote monitoring server 200 may adopt a policy that warning information is transferred based on the energizing state of the socket 20 located at a specific area. Examples of such policy include the example case in which warning information is transferred when a frequency in changes in the energizing state of the socket 20 of the lighting of the lavatory is equal to or more than a predetermined frequency (i.e., the person to be observed goes to the lavatory frequently.)

Figure 12:
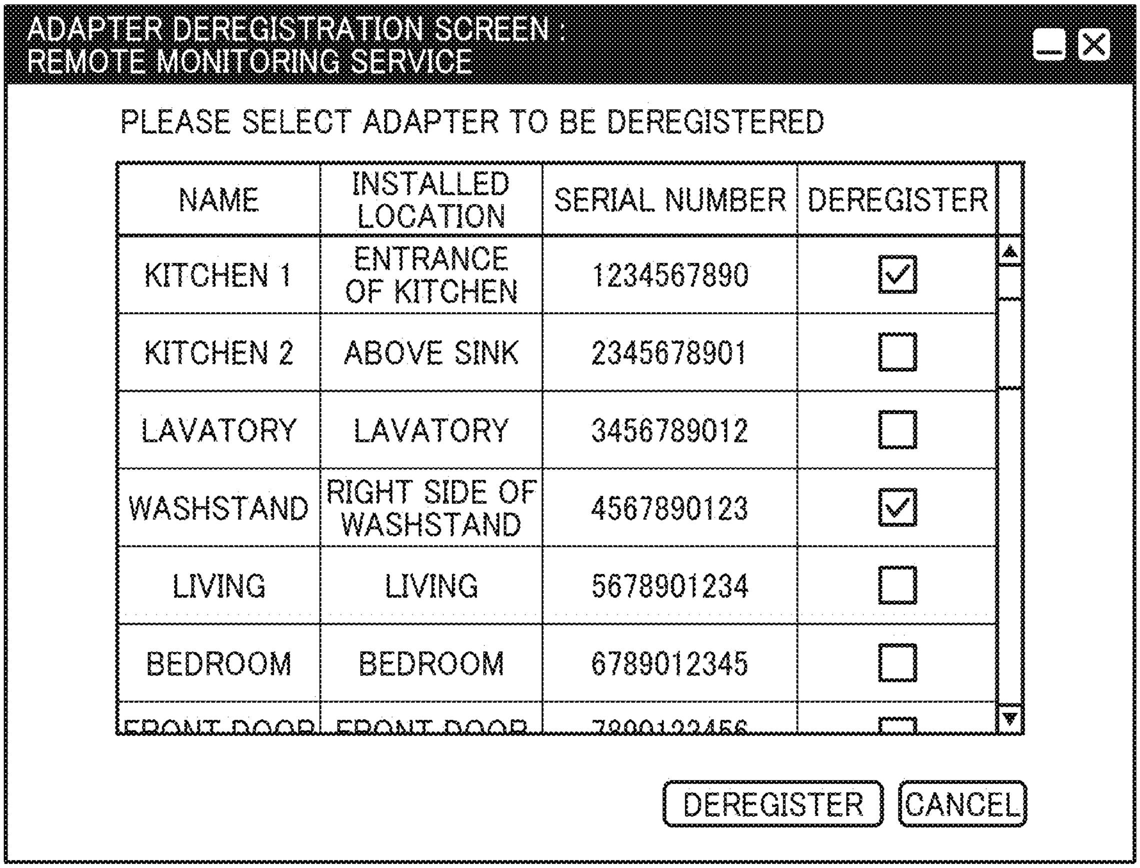
FIG. 12 is a diagram illustrating a service screen displayed by the remote monitoring system as an embodiment of the present invention.

In this embodiment, the adapter 100 is deregistered as described below. That is, in response to a user selection of a "deregister" key displayed on the monitoring information screen in FIG. 11B, the monitoring information screen transitions to an adapter deregistration screen illustrated in FIG. 12. In this case, on the adapter deregistration screen, a list of registered adapters 100 is displayed along with check boxes. In response to a user operation that checks a box corresponding to an adapter to be deregistered and selects the "deregistration" key at S17, the user terminal 40 transfers a deregistration request including a serial number of the adapter 100 selected by user operation to the remote monitoring server 200 at S18. In response, the adapter registration unit 202 in the remote monitoring server 200 deletes a record corresponding to the serial number included in the deregistration request from the adapter information management table 600 (illustrated in FIG. 4B) associated with the user ID of the login user at S19.

Now, a hardware configuration of the remote monitoring server 200 in this embodiment is described below with reference to a diagram illustrating a hardware configuration in FIG. 13.

The remote monitoring server 200, which is implemented by an information processing apparatus such as a computer, includes a processor 212 that controls entire operation of the apparatus, a ROM 213 that stores a boot program and a firmware program etc., a RAM 214 that operates as a work area for executing the programs, an auxiliary memory 215 that stores an operating system (OS) and various applications etc., an input/output interface 216 that connects external input/output devices, and a network interface 218 for connecting to the network 70.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In case any of the above-described functions is achieved using an executable computer program, such computer program may be described in any programming language such as C, C++, C#, Java (registered trademark), and JavaScript (registered trademark). The computer program may be recorded in any desired computer readable recording medium such as a hard disk device, a compact disk read only memory (CD-ROM), a magneto optical disc (MO), a digital versatile disk (DVD), a flexible disk, an electrically erasable and programmable read only memory (EEPROM), and erasable programmable read only memory (EPROM). Further, the computer program may be distributed through a network in any format readable by any device.

The illustrated server apparatuses are only illustrative of one of several computing environments for implementing the embodiments disclosed herein. For example, in some embodiments, the remote monitoring server 200 includes a plurality of computing devices, e.g., a server cluster, that are configured to communicate with each other over any type of communications link, including a network, a shared memory, etc. to collectively perform the processes disclosed herein. Further, the external server 200 and the remote monitoring server 200 may be the same computing device.

Moreover, the remote monitoring server 200, and any one of the user terminal 40 and the external server 300, can be configured to share the processing steps disclosed, e.g, in any one of FIGS. 5 and 10, in various combinations. For example, S9 of generating the chart performed by the remote monitoring server 200 can be performed by the user terminal 40 or the external server 300.

Further, each of the plurality of computing devices is configured to communicate with one or more external computing devices using any type of communication link, including any combination of wired and wireless communication links; using any type of network, including the Internet, a wide-area network (WAN), a local-area network (LAN), and a virtual private network (VPN); and using any combination of transmission techniques and communication protocols.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, as long as the energizing state indicating on or off of the light bulb 30 is transmitted to the remote monitoring server 200, a part or entire of the wireless communication unit 10 does not have to be installed within the adapter 100. The wireless communication unit 10 may be provided outside the adapter 100.

In one example, the wireless communication unit 10 may be installed within the light bulb 30, to be connected directly to the socket 20. In such case, the light bulb 30 may be impressed with a serial number, as one example of identification information for identifying the light bulb 30 ("the light ID").

Further, the identification information may be attached on each light bulb 30 or the adapter 100 in various other ways. For example, a seal indicating the serial number may be attached to the surface of the adapter 100 or the light bulb 30.

Further, the remote monitoring server 200 may manage various types of information to be used for generating monitoring information for display to the user in various other ways. For example, as long as the light bulb 30, or the place of the light bulb 30 is installed, can be identified, the remote monitoring server 200 may manage various types of information in any one of the tables described above using any type of identification information, such as an ID for the wireless communication unit transmitting energizing information of the light bulb 30, an ID for the light bulb 30, etc. For example, in case the light bulb 30 including the wireless communication unit 10 is provided, the user may register, into the remote monitoring server 200, the serial number of the light bulb 30, the name assigned to the light bulb 30, the place of the light bulb 30, and the transmission interval of energizing information.

Moreover, the user may register any number of adapters 100 as a target adapter 100 to be monitored, as long as at least one adapter 100 is registered for the person to be observed.

The invention claimed is:

1. A remote monitoring system, comprising:
- one or more lamps electrically connected to a socket for lighting;
- a server communicably connected with the one or more lamps via a network; and
- an operation terminal communicably connected with the server,
- each lamp of the one or more lamps to communicate with the server using electric power supplied from the socket while the socket is energized,
- the server being configured to:
- receive a warning condition from the operation terminal, the warning condition indicating a condition for causing transmission of warning information;
- generate monitoring information based on communication with the lamp; and
- transmit the warning information, in a case where the warning condition is satisfied based on the monitoring information.

2. The system of claim 1, wherein:
- the server is further configured to generate a visual representation presenting a log based on the communication.

3. The system of claim 1, wherein the server is further configured to:
- obtain a name or an installation location of each one of the one or more lamps, from the operation terminal; and
- generate, for each lamp of the one or more lamps, monitoring information including one of the name and the installation location.

4. The system of claim 2, wherein the server is further configured to:
- obtain, from the operation terminal, identification information of the one or more lamps subjected to monitoring; and
- update the monitoring information, based on information transmitted from the one or more lamps identified with the identification information of the one or more lamps.

5. The system of claim 1, wherein the server is further configured to:

determine that the lamp is energized based on information received from the one or more lamps, determine that the lamp is not energized in a case where no information is received after receiving the information, and generate the monitoring information based on a result of the determination.

6. The system of claim 1, wherein the server is further configured to:

receive, from the operation terminal, destination information indicating a destination to which the warning information is transmitted; and transmit the warning information to the destination indicated by the destination information.

7. The system of claim 1, wherein:

the server is further configured to transmit the warning information to the operation terminal.

8. An information processing apparatus communicably connected with one or more lamps via a network, each lamp of the one or more lamps being electrically connected with a socket for lighting, the information processing apparatus comprising circuitry configured to:

receive a warning condition from an operation terminal, the warning condition indicating a condition for causing transmission of warning information;

generate monitoring information based on communication with the lamp; and transmit the warning information, in a case where the warning condition is satisfied based on the monitoring information.

9. The apparatus of claim 8, wherein:

the circuitry is further configured to generate a visual representation presenting a log based on the communication.

10. The apparatus of claim 8, wherein the circuitry is further configured to:

obtain a name or an installation location of each lamp of the one or more lamps, from the operation terminal; and generate, for each lamp of the one or more lamps, monitoring information including one of the name and the installation location.

11. The apparatus of claim 8, wherein the circuitry is further configured to:

obtain, from the operation terminal, identification information of the one or more lamps subjected to monitoring; and update the monitoring information, based on information transmitted from the one or more lamps identified with the identification information of the one or more lamps.

12. The apparatus of claim 8, wherein the circuitry is further configured to:

determine that the lamp is energized based on information received from the one or more lamps, and determine that the lamp is not energized in a case where no information is received after receiving the information, and generate the monitoring information based on a result of the determination.

13. The apparatus of claim 8, wherein the circuitry is further configured to:

receive, from the operation terminal, destination information indicating a destination to which the warning information is transmitted; and transmit the warning information to the destination indicated by the destination information.

14. The apparatus of claim 8, wherein the circuitry is further configured to:

transmit the warning information to the operation terminal.

15. A method, comprising:

receiving a warning condition from an operation terminal, the warning condition indicating a condition for causing transmission of warning information;

generating monitoring information based on communication with a lamp; and transmitting the warning information, in a case where the warning condition is satisfied based on the monitoring information.

16. The method of claim 15, further comprising:

generating a visual representation presenting a log based on the communication.

17. The method of claim 15, further comprising:

obtaining, from the operation terminal, a name or an installation location of the lamp; and generating, for the lamp, monitoring information including one of the name and the installation location.

18. The method of claim 15, further comprising:

obtaining, from the operation terminal, identification information of the lamp subjected to monitoring; and updating the monitoring information, based on information transmitted from the lamp identified with the identification information.

19. The method of claim 15, further comprising:

determining that the lamp is energized based on information received from the lamp, determining that the lamp is not energized in a case where no information is received after receiving the information, and generate the monitoring information based on a result of the determining that the lamp is energized and the determining that the lamp is not energized.

20. The method of claim 15, further comprising:

receiving destination information indicating a destination to which the warning information is transmitted; and transmitting the warning information to the destination indicated by the destination information.

21. The method of claim 15, further comprising:

transmitting the warning information to the operation terminal.

22. A remote monitoring system, comprising:

one or more adapters each of which electrically connects a lamp and a socket;

a server communicably connected with the one or more adapters via a network; and an operation terminal communicably connected with the server, each adapter of the one or more adapters to communicate with the server using electric power supplied from the socket while the socket is energized, the server being configured to:

receive a warning condition from the operation terminal, the warning condition indicating a condition for causing transmission of warning information;

generate monitoring information based on communication with the one or more adapters; and transmit the warning information, in a case where the warning condition is satisfied based on the monitoring information.

23. The system of claim 22, wherein:

the server is further configured to generate a visual representation presenting a log based on the communication.

24. The system of claim 22, wherein the server is further configured to:
obtain a name or an installation location of each one of the one or more adapters, from the operation terminal; and
generate, for each adapter of the one or more adapters, monitoring information including one of the name and the installation location.

25. The system of claim 22, wherein the server is further configured to:
obtain, from the operation terminal, identification information of the one or more adapters subjected to monitoring; and
update the monitoring information, based on information transmitted from the one or more adapters identified with the identification information of the one or more adapters.

26. The system of claim 22, wherein the server is further configured to:
determine that the adapter is energized based on information received from the one or more adapters,
determine that the adapter is not energized in a case where no information is received after receiving the information, and
generate the monitoring information based on a result of the determination.

27. The system of claim 22, wherein the server is further configured to:
receive, from the operation terminal, destination information indicating a destination to which the warning information is transmitted; and
transmit the warning information to the destination indicated by the destination information.

28. The system of claim 22, wherein:
the server is further configured to transmit the warning information to the operation terminal.

29. An information processing apparatus communicably connected with one or more adapters via a network, each adapter of the one or more adapters being configured to electrically connect a lamp and a socket for lighting, the information processing apparatus comprising circuitry configured to:
receive a warning condition from an operation terminal, the warning condition indicating a condition for causing transmission of warning information;
generate monitoring information based on communication with the one or more adapters; and
transmit the warning information, in a case where the warning condition is satisfied based on the monitoring information.

30. The apparatus of claim 29, wherein:
the circuitry is further configured to generate a visual representation presenting a log based on the communication.

31. The apparatus of claim 29, wherein the circuitry is further configured to:
obtain a name or an installation location of each one of the one or more adapters, from the operation terminal; and
generate, for each one of the one or more adapters, monitoring information including one of the name and the installation location.

32. The apparatus of claim 29, wherein the circuitry is further configured to:
obtain, from the operation terminal, identification information of the one or more adapters subjected to monitoring; and
update the monitoring information, based on information transmitted from the one or more adapters identified with the identification information of the one or more adapters.

33. The apparatus of claim 29, wherein the circuitry is further configured to:
determine that the adapter is energized based on information received from the one or more adapters,
determine that the adapter is not energized in a case where no information is received after receiving the information, and
generate the monitoring information based on a result of the determination.

34. The apparatus of claim 29, wherein the circuitry is further configured to:
receive, from the operation terminal, destination information indicating a destination to which the warning information is transmitted; and
transmit the warning information to the destination indicated by the destination information.

35. The apparatus of claim 29, wherein the circuitry is further configured to:
transmit the warning information to the operation terminal.

36. A method, comprising:
receiving a warning condition from an operation terminal, the warning condition indicating a condition for causing transmission of warning information;
generating monitoring information based on communication with an adapter; and
transmitting the warning information, in a case where the warning condition is satisfied based on the monitoring information.

37. The method of claim 36, further comprising:
generating a visual representation presenting a log based on the communication.

38. The method of claim 36, further comprising:
obtaining a name or an installation location of the adapter, from the operation terminal; and
generating, for the adapter, monitoring information including one of the name and the installation location.

39. The method of claim 36, further comprising:
obtaining, from the operation terminal, identification information of the adapter subjected to monitoring; and
updating the monitoring information, based on information transmitted from the adapter identified with the identification information of the adapter.

40. The method of claim 36, further comprising:
determining that the adapter is energized based on information received from the adapter,
determining that the adapter is not energized in a case where no information is received after receiving the information, and
generate the monitoring information based on a result of the determining that the adapter is energized and the determining that the adapter is not energized.

41. The method of claim 36, further comprising:
receiving destination information indicating a destination to which the warning information is transmitted; and
transmitting the warning information to the destination indicated by the destination information.

42. The method of claim 36, further comprising:
transmitting the warning information to the operation terminal.

* * * * *